(12) United States Patent
Nelson et al.

(10) Patent No.: US 9,497,900 B2
(45) Date of Patent: Nov. 22, 2016

(54) PLANTER WITH POST SEED TUBE MOUNTED ROW CLEANER AND DEPTH CONTROL TOOL

(71) Applicant: AGCO Corporation, Hesston, KS (US)

(72) Inventors: Darren J. Nelson, Hutchinson, KS (US); Nyle C. Wollenhaupt, Newton, KS (US); Erik L. Barnes, Peabody, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/022,174

(22) PCT Filed: Sep. 19, 2014

(86) PCT No.: PCT/US2014/056523
§ 371 (c)(1),
(2) Date: Mar. 15, 2016

(87) PCT Pub. No.: WO2015/042377
PCT Pub. Date: Mar. 26, 2015

(65) Prior Publication Data
US 2016/0227701 A1  Aug. 11, 2016

Related U.S. Application Data

(60) Provisional application No. 61/880,037, filed on Sep. 19, 2013.

(51) Int. Cl.
*A01C 5/06* (2006.01)
*A01C 7/20* (2006.01)

(52) U.S. Cl.
CPC ............ *A01C 7/203* (2013.01); *A01C 5/064* (2013.01); *A01C 5/066* (2013.01); *A01C 7/206* (2013.01)

(58) Field of Classification Search
CPC ......... A01C 5/06; A01C 5/066; A01C 7/206
USPC .............. 111/62, 134–137, 69, 81, 139–143, 111/157, 163–169
See application file for complete search history.

(56) References Cited

U.S. PATENT DOCUMENTS 4,213,408 A * 7/1980 West ..................... A01C 5/06
111/137
5,375,542 A  12/1994 Schaffert
(Continued)

OTHER PUBLICATIONS

European Patent Office, International Search Report for International Patent Application No. PCT/US2014/056523, dated Dec. 16, 2014.

*Primary Examiner* — John G Weiss

(57) ABSTRACT

A planter unit for planting seeds as it traverses a field in a direction of travel includes a seed delivery tube and a furrow opener configured to open a furrow in the soil for receiving seeds dropped through the delivery tube. A gauge wheel assembly controls the depth of penetration of the furrow opener. The planter unit also has a furrow closing tool that closes the furrow, the furrow closing tool positioned after the delivery tube in the direction of travel. The planter unit also has a row cleaning and depth control tool positioned after the furrow closing tool. The row cleaning and depth control tool has first and second row whippers that push excess soil out away from above where seeds were dropped in the furrow, wherein vertical position of first and second row whippers is selectively adjustable relative the vertical position of the furrow opener.

8 Claims, 4 Drawing Sheets

(56) References Cited

U.S. PATENT DOCUMENTS

| | | | | |
|---|---|---|---|---|
| 5,497,717 A * | 3/1996 | Martin | ................... | A01C 5/066 |
| | | | | 111/140 |
| 6,279,666 B1 | 8/2001 | Nikkel et al. | | |
| 6,530,334 B2 * | 3/2003 | Hagny | ................... | A01C 7/006 |
| | | | | 111/189 |
| 7,308,859 B2 * | 12/2007 | Wendte | ................... | A01C 5/064 |
| | | | | 111/164 |
| 7,581,503 B2 * | 9/2009 | Martin | ................... | A01C 5/066 |
| | | | | 111/167 |
| 7,743,718 B2 * | 6/2010 | Bassett | ................... | A01C 7/006 |
| | | | | 111/135 |
| 8,267,021 B2 * | 9/2012 | Mariman | ................. | A01C 5/06 |
| | | | | 111/164 |
| 8,939,095 B2 * | 1/2015 | Freed | ................... | A01B 49/027 |
| | | | | 111/164 |
| 2011/0184551 A1 * | 7/2011 | Kowalchuk | ............ | A01C 7/105 |
| | | | | 700/219 |

\* cited by examiner

US 9,497,900 B2

PLANTER WITH POST SEED TUBE MOUNTED ROW CLEANER AND DEPTH CONTROL TOOL

CROSS REFERENCE TO RELATED APPLICATION

This application claims the benefit of U.S. Provisional Application No. 61/880,037, entitled PLANTER WITH POST SEED TUBE MOUNTED ROW CLEANER AND DEPTH CONTROL METHOD, filed Sep. 19, 2013, which is hereby incorporated by reference in its entirety.

BACKGROUND OF THE INVENTION

1. Field of Invention

This invention relates generally to agricultural planters, and more particularly to a planter having soil cleaning members that control the depth of soil above the seed.

2. Description of Related Art

Planters with a plurality of seed meters are used to plant seeds upon or in the ground at various depths and spacings. Typical planters use a furrow opener, such as a double-disc opener having a pair of downwardly and slightly forwardly converging discs, to create a furrow in the soil for receiving seeds dropped through a delivery tube. A pair of closing wheels attached at the rear of the planter closes the seed furrow after the seeds have been deposited therein. Some designs mount the closing wheels on a single shaft while other designs position the closing wheels in a staggered arrangement using with each wheel on a different shaft.

Uniform seeding emergence is desirable for successful crop establishment. This requires the seed to be placed a constant depth. Current planting machines are designed to place seed at a depth controlled by a depth gauging device such as gauge wheels running in contact with the soil surface. Gauge wheels provide support for the planter and set the depth of penetration of the furrow opener into the ground. The optimum seeding depth is usually based on crop type, seed size, seed vigor, soil temperature and soil moisture conditions.

However, planting seed at a constant depth across a field may result in seeds being placed in variable soil moisture and soil temperature conditions. The result can be uneven seed germination and emergence, and potentially crop failure. It would therefore be desirable to drop the seed at one depth while removing soil and crop residues above the seed to maintain a generally constant soil thickness over the seed.

OVERVIEW OF THE INVENTION

In one embodiment, the invention is directed to a planter unit for planting seeds as it traverses a field in a direction of travel. The planter unit includes a seed delivery tube and a furrow opener configured to open a furrow in the soil for receiving seeds dropped through the delivery tube. A gauge wheel assembly controls the depth of penetration of the furrow opener. The planter unit also has a furrow closing tool that closes the furrow, the furrow closing tool positioned after the delivery tube in the direction of travel. The planter unit also has a row cleaning and depth control tool positioned after the furrow closing tool. The row cleaning and depth control tool has first and second row whippers that push excess soil out away from above where seeds were dropped in the furrow, wherein vertical position of first and second row whippers is selectively adjustable relative the vertical position of the furrow opener.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
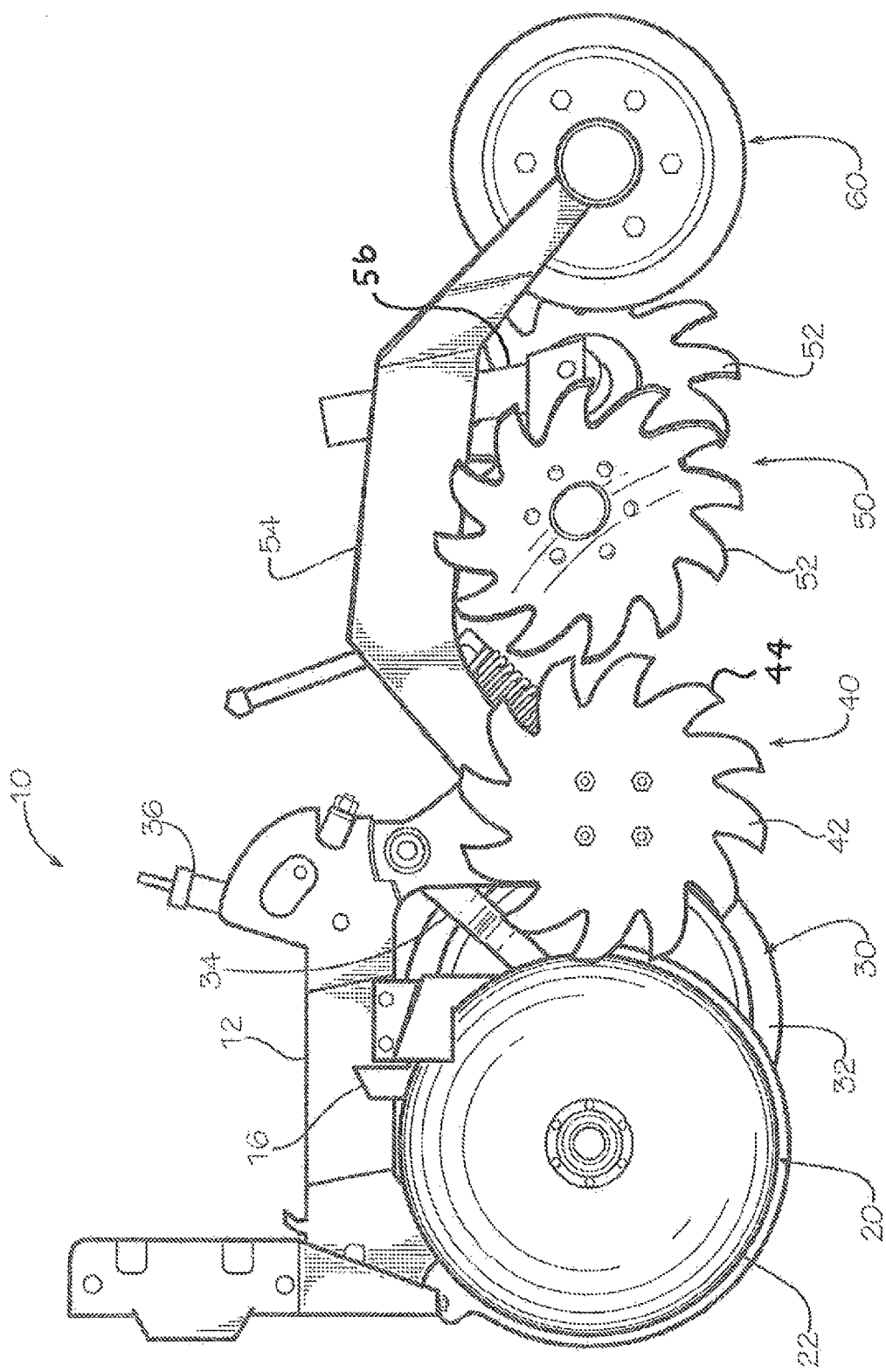
FIG. 1 is a side perspective view of a planter unit in accordance with the principles of the present invention.
Figure 2:
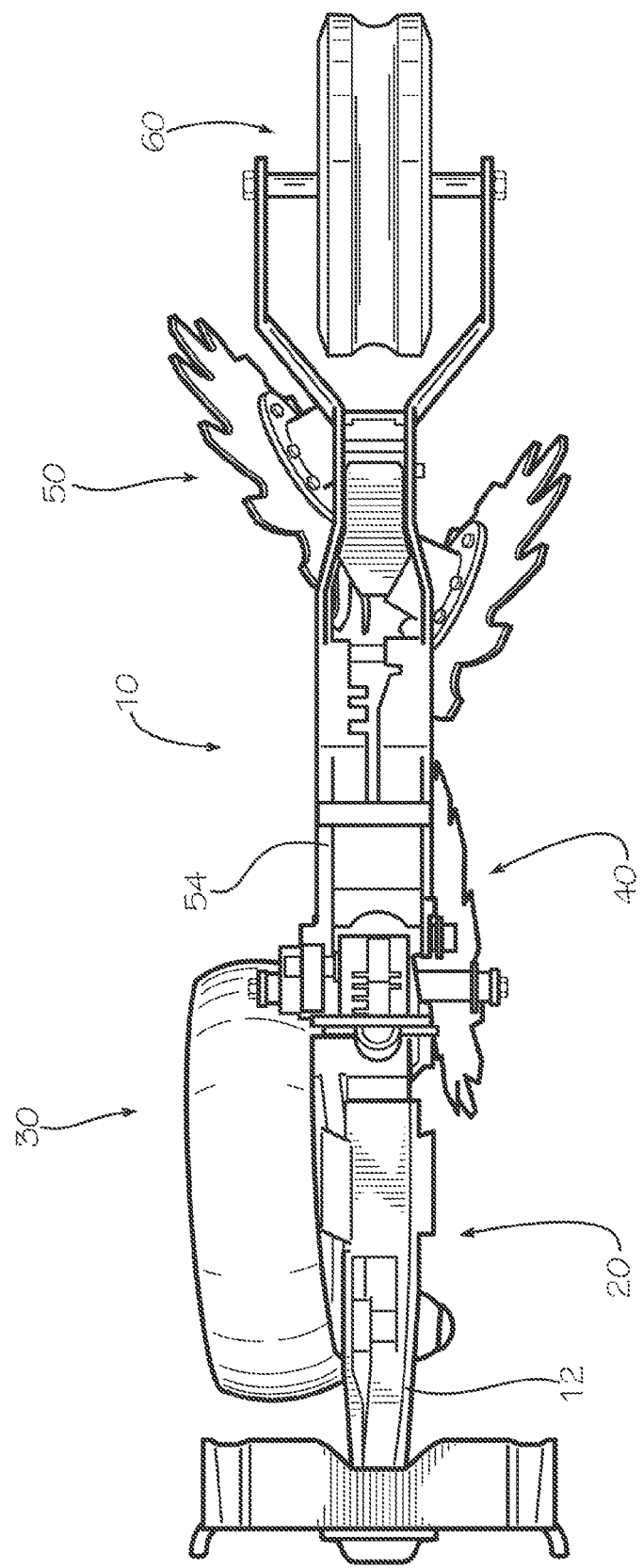
FIG. 2 is a top view of the planter unit of FIG. 1.
Figure 3:
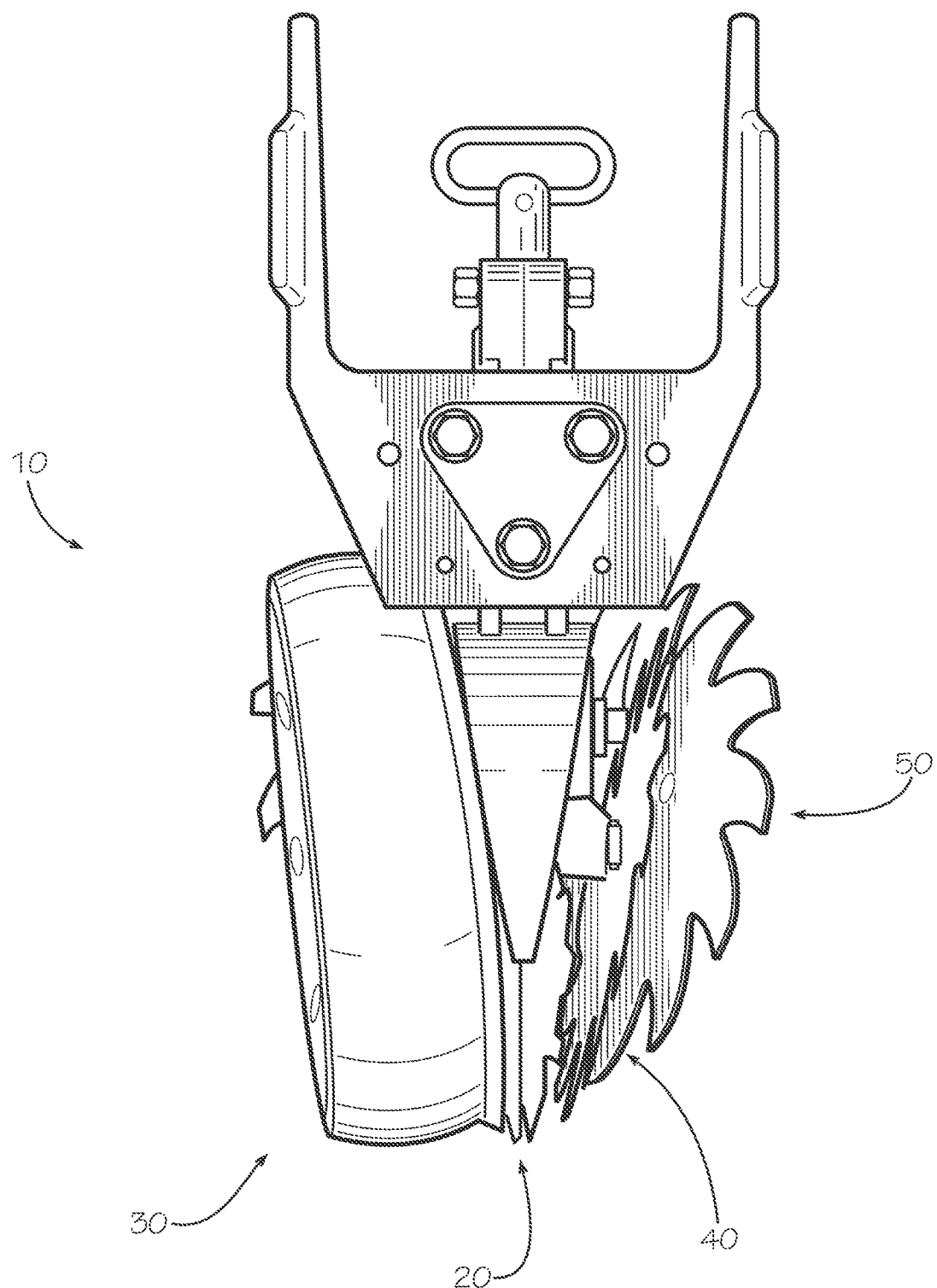
FIG. 3 is a front view of the planter unit of FIG. 1.
Figure 4:
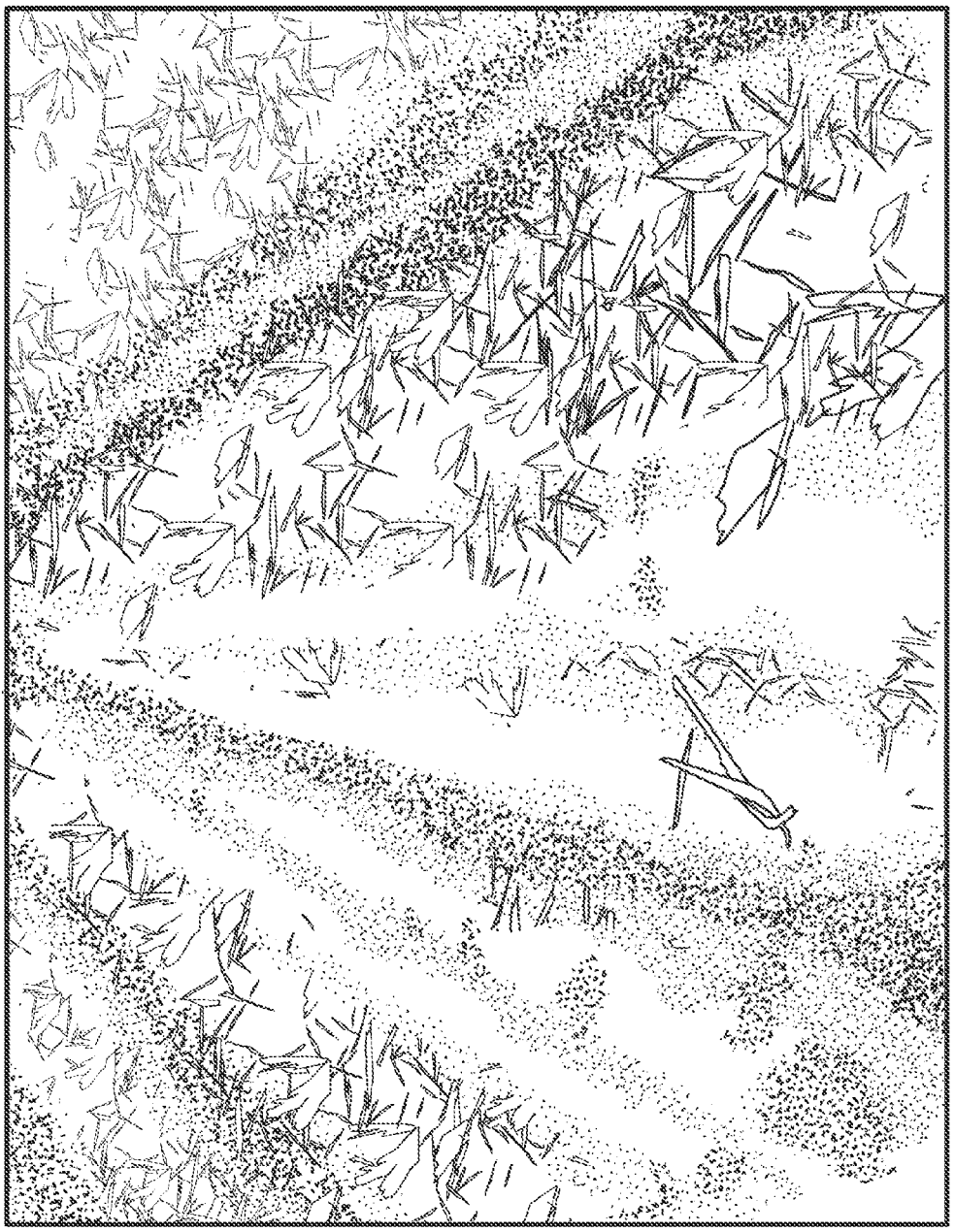
FIG. 4 is a view of a field planted using the planter unit of FIG. 1.

Referring to FIG. 1, a portion of a planter unit 10 for planting row crop seeds is shown as traveling in the direction of arrow during operation. The planter unit 10 including a frame 12 to which may be mounted many ground engaging members and crop delivering elements. Crop delivering elements may include a seed hopper and seed metering disc (not shown for simplicity) of conventional design that deliver seed to be planted to a seed delivery tube 16. For purposes of describing the present invention, the illustrated ground engaging members positioned ahead of the seed delivery tube 16 include a furrow opener 20 for opening a furrow in the soil for receiving seeds dropped through the delivery tube 16 and gauge wheel assembly 30. The planter unit 10 may also comprise other components such as a trash clearing device and a fertilizer/pesticide placement device which are omitted from the drawings and not discussed herein for simplicity. As is known in the art, the furrow opener 20 may take a variety of different forms. For example, the furrow opener 20 may take the form of a double-disc opener having a pair of downwardly and slightly forwardly converging discs 22 rotatably mounted on frame 12. However, the furrow opener 20 may include only a single opening disc 22. Desirably, the furrow opener 20 forms a substantially v-shaped furrow as the planter unit 10 proceeds through the field. The delivery tube 16 may project downwardly between the pair of discs 20 and may have a lower discharge end facing generally rearwardly and downwardly to discharge the seeds into the furrow.

In the illustrated embodiment, the gauge wheel assembly 30 comprises a single gauge wheel 32 disposed on one side of the furrow opener 20 and may be rotatably mounted on frame 12 via a gauge wheel arm 34 and may provide support for frame 12. The gauge wheel assembly 30 sets the depth of penetration of the furrow opener 20 into the ground with a height adjust mechanism 36 as is known in the art. One skilled in the art will understand that the gauge wheel assembly 30 may also include a second gauge wheel (not shown) disposed on an opposite side from the first gauge wheel 32 without departing from the scope of the invention.

After the seed delivery tube 16, the planter unit 10 comprises a furrow closing tool 40 that closes the seed furrow after seeds have been deposited therein through the delivery tube 16. In the illustrated embodiment, the furrow closing tool 40 comprises a single rotatable closer 42 having a shark-tooth periphery 44. In one embodiment, the furrow closing tool 40 is attached to the rear of frame 12 on the side opposite the gauge wheel 32. The depth the closing tool 40 penetrates the soil may be selected independently from the depth of the furrow opener 20, or the closing tool 40 may use the gauge wheel assembly 30 to control its depth. Desirably, the shark-tooth closer 42 pushes soil from one side of the furrow over the seeds and traps the seeds against the sidewall of the opposing side of the v-shaped furrow.

After the furrow closing tool 40, the planter unit 10 comprises a row cleaning and depth control tool 50. In the illustrated embodiment the row cleaning and depth control tool 50 comprises first and second row whippers 52. The row whippers 52 may be attached to planter unit 10 by a second frame 54 on arm 56. One of the row whippers 52 may be positioned closer to the front of the planter unit 10 than the other of the row whippers 52. The row whippers 52 push excess soil out away from above where the seed was dropped in the furrow. The vertical, position of first and second row whippers 52 relative to frame 12 and the furrow opener 20 may be selectively adjusted based on how much soil is desired to be above the bottom of the furrow created by the furrow opener 20. The use of the row cleaning and depth control tool 50 located after the furrow opener 20, seed delivery tube 16 and furrow closing tool 40 allows the seed to be dropped at one depth and then excess soil and crop residues to be removed from above the seed to maintain a constant desired seed depth after the seed is dropped. Additionally, throwing the heavier soil onto the crop residues to the side of the furrow helps hold the crop residue in place and keeps it from moving back over top of where the seed was planted.

After the row cleaning and depth control tool 50, the planter unit 10 may comprise a press wheel 60 for packing the soil above the furrow. Suitable press wheels are well known in the art and need to be discussed in further detail herein.

Method of Operation

In use, planter unit 10 is used to open a seed-receiving furrow in the ground. The depth of the furrow opener 20 is selected based on the conditions, such as moisture or temperature, of the soil. Seeds are deposited in the furrow at the desired spacing through the delivery tube 16. Desirably, the seeds are dropped slightly to one side of the furrow and the closing tool 40 is used to move soil from the opposing side onto the seed to achieve good seed-to-soil contact when the furrow is closed. After the furrow is closed, the row cleaner and depth control tool 50 removes any excess soil from above where the seed was dropped. The excess soil is moved outward from above the furrow and on top of any crop residue adjacent the furrow to trap the crop residue in place.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A planter unit for planting seeds as it traverses a field in a direction of travel, the planter unit comprising:
   a seed delivery tube;
   a furrow opener configured to open a furrow in the soil for receiving seeds dropped through the delivery tube;
   a gauge wheel assembly configured to control the depth of penetration of the furrow opener;
   a furrow closing tool that closes the furrow, the furrow closing tool positioned after the delivery tube in the direction of travel; and
   a row cleaning and depth control tool positioned after the furrow closing tool, the row cleaning and depth control tool comprising first and second row whippers that remove excess soil from above where seeds were dropped in the furrow, wherein the first and second row whippers are rotatably mounted on the planter unit in a forwardly converging manner so as to push soil outwardly to adjust a vertical position of the depth of the seeds relative a surface of the field as the planter unit traverses the field in the direction of travel.

2. The planter unit of claim 1 wherein the furrow opener has at least one disc rotatably mounted on a frame of the planter unit.

3. The planter unit of claim 1 wherein the furrow opener is configured to form a v-shaped furrow as the planter unit proceeds through the field.

4. The planter unit of claim 1 wherein the gauge wheel assembly consists of a single gauge wheel disposed on one side of the furrow opener.

5. The planter unit of claim 1 wherein the furrow closing tool consists of a single rotatable closer.

6. The planter unit of claim 5 wherein the single rotatable closer has a shark-tooth periphery.

7. The planter unit of claim 5 wherein the single rotatable closer is attached to a frame of the planter unit on a site opposite a single gauge wheel.

8. The planter unit of claim 1 further comprising a press wheel for packing the soil above the furrow after the row cleaning and depth control tool.

* * * * *